United States Patent [19]

Smith

[11] Patent Number: 4,494,772
[45] Date of Patent: Jan. 22, 1985

[54] ANTI-ARCH VEHICLE SUSPENSION

[76] Inventor: Paul Smith, 16700 Gledhill, Sepulveda, Calif. 91343

[21] Appl. No.: 494,081

[22] Filed: May 12, 1983

[51] Int. Cl.³ .............................................. B60G 11/46
[52] U.S. Cl. ...................................... 280/712; 267/31
[58] Field of Search .................... 280/712; 267/31, 32, 267/64.19, 64.28, 56

[56] References Cited

U.S. PATENT DOCUMENTS

| | | | |
|---|---|---|---|
| 2,885,219 | 5/1959 | Paton | 267/67 |
| 3,063,732 | 11/1962 | Harbers et al. | 267/32 |
| 3,269,418 | 8/1966 | Jackson et al. | 280/712 |
| 3,309,107 | 3/1967 | Chieger | 280/712 |
| 3,406,957 | 10/1968 | Almquist | 267/67 |
| 3,477,739 | 11/1969 | White | 280/712 |
| 3,578,355 | 5/1971 | Oeder | 280/712 |
| 3,664,681 | 5/1972 | Thaxton | 280/712 |
| 3,743,315 | 7/1973 | Bilas | 280/712 |
| 3,850,437 | 11/1974 | Owen | 280/712 |
| 3,861,708 | 1/1975 | Fier | 280/712 |
| 3,970,293 | 7/1976 | Sweet et al. | 280/712 |

Primary Examiner—Richard A. Bertsch
Attorney, Agent, or Firm—Freilich, Hornbaker, Rosen & Fernandez

[57] ABSTRACT

A vehicle suspension is described for a vehicle whose frame is supported through leaf springs lying on the axles, which avoids reverse bending of the springs while also providing a smoother ride. The system includes an air sleeve having an upper end mounted on the vehicle frame and a lower end bearing against the top of the leaf spring at a location between the axle and the front of the spring. The distance between the axle and the air sleeve is about 38% of the total distance between the axle and the front of the spring where it is connected to the frame, this spacing having been found to provide maximum shock absorbtion and smoothness of ride.

3 Claims, 4 Drawing Figures

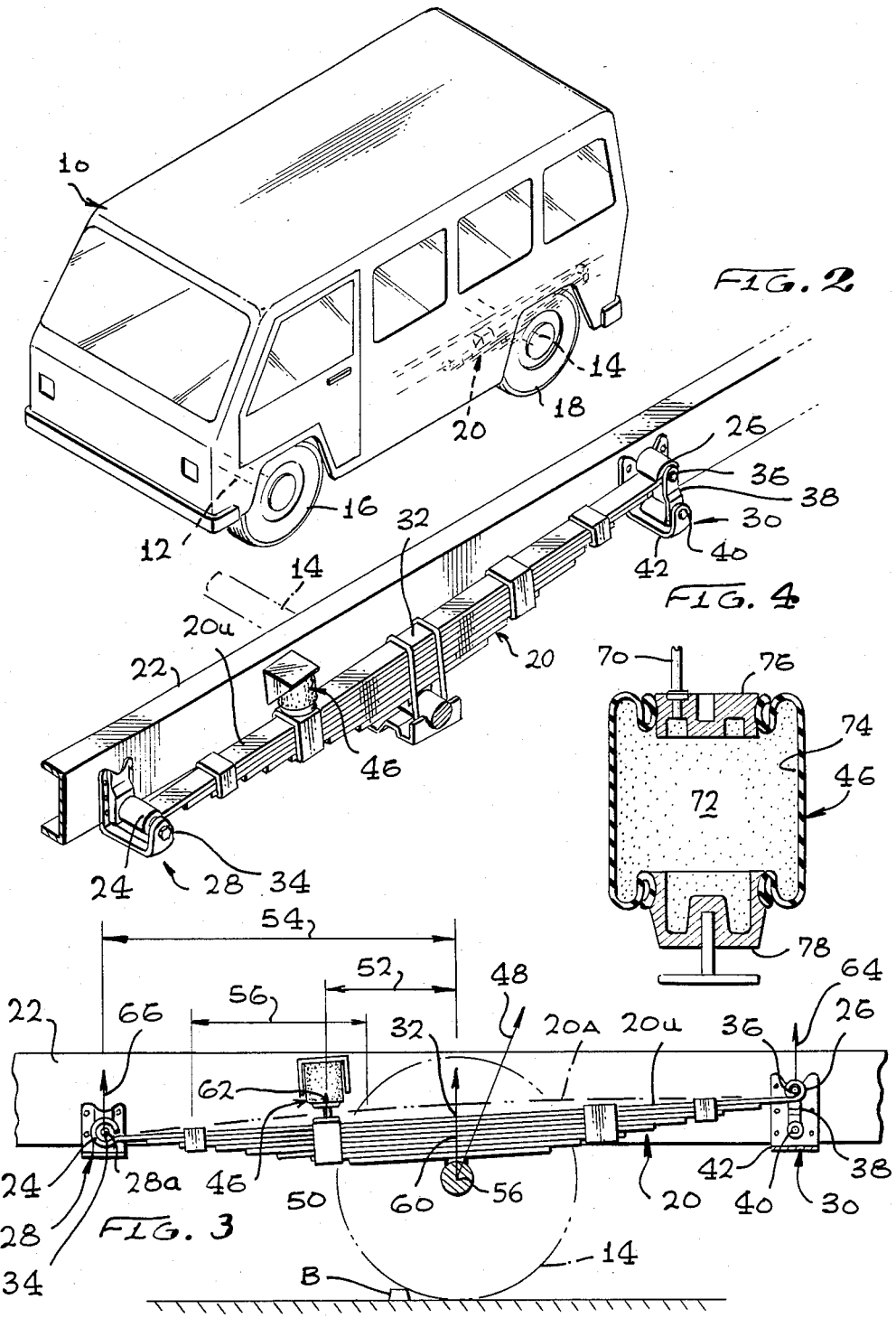

ANTI-ARCH VEHICLE SUSPENSION

BACKGROUND OF THE INVENTION

A rear axle of a vehicle is typically mounted on the frame by a leaf spring whose opposite ends are continually held to the frame by connectors and whose middle portion lies directly over the rear axle. The leaf spring is preferably constructed so that under quiescent conditions its top is flat. When the spring is "reversely" curved, so that its top surface is convex, the ride is harsh. One way that has been used to avoid reverse bending is to place an air sleeve or air bag between the frame of the vehicle and the axle. However, this has been found to still result in a relatively harsh ride. An air sleeve would appear to be a good mechanism for helping to absorb shock in combination with the length of the leaf spring, but none of the systems known to applicant have produced a very smooth ride.

It may be noted that air sleeves have been proposed in the patent literature for use in conjunction with leaf springs to support one end of the leaf spring, with all of the load transmitted through the front portion of the leaf spring being transmitted through the air sleeve. In two patents of this type, U.S. Pat. No. 3,309,107 by Chieger (FIGS. 5 and 7) and U.S. Pat. No. 3,063,732 By Harbers, air bags or sleeves have been placed at the front of the leaf spring so all shock has been transmitted through the air bags. However, such air bags must be large so they are capable of transmitting large forces, since at least half of the weight supported by the adjacent vehicle tire must be transmitted through the air bag. Also, the air bag then does not avoid reverse spring curvature. An air sleeve assembly which enabled most of the shock to be transmitted through ordinary connectors, with a moderately low capacity air sleeve serving to supplement the leaf spring and prevent reverse curvature of the leaf spring, and which resulted in a very smooth ride, would be of considerable benefit.

SUMMARY OF THE INVENTION

In accordance with one embodiment of the present invention, an improvement is provided for a suspension system of the type wherein a portion of a vehicle frame is continually attached to the ends of a leaf spring whose middle is supported on a vehicle axle. The improvement enables most of the weight of the vehicle frame that is carried by a tire, to be carried by the leaf spring while effectively absorbing shocks. The improvement includes an air sleeve device which is coupled between the leaf spring and the vehicle frame to support some of the weight of the vehicle frame on a middle portion of the spring. The air sleeve device lies forward of the axle but rearward of the connector which connects the front end of the spring to the frame. The air sleeve device preferably lies between 25% and 75% of the distance between the axle and the connector of the front end of the spring.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a vehicle which utilizes the vehicle suspension system of the present invention.

FIG. 2 is a perspective view of a portion of the vehicle of FIG. 1, showing a suspension arrangement therein.

FIG. 3 is a side elevation view of the arrangement of FIG. 2.

FIG. 4 is a sectional view of an air sleeve device of the arrangement of FIG. 3.

DESCRIPTION OF THE PREFERRED EMBODIMENT

FIG. 1 illustrates a recreational vehicle 10 which has front and rear axles 12, 14 that are supported on front and rear wheels 16, 18. As shown in FIG. 2, the axle 14 supports a leaf spring 20 which, in turn, supports the chassis or frame 22 of the vehicle. The leaf spring has front and rear ends 24, 26 that are connected through connectors 28, 30 to the frame, and has a middle 32 that is supported directly over the rear axle 14.

The leaf spring 20 includes several leafs of varying length, with the uppermost leaf 20U having ends extending in loops to form the ends of the spring. The connector 28 is attached to the front end 24 of the spring by a bolt 34 that passes through the looped end of the spring, while the front connector itself is attached by several bolts to the vehicle frame. Thus, the front of the spring is continually connected to the vehicle frame, even in the quiescent condition of the vehicle, to continually transfer part of the frame weight to the front end of the spring for transfer to the axle 14. The rear end 26 of the spring is formed by a loop of the top leaf. The rearward end 26 is held by a bolt 36 that passes through it and the upper end of a shackle 38. The lower end of the shackle is pivotally mounted about a lower bolt 40 on a lower rear connector 42 that is bolted to the vehicle frame. A portion of the vehicle frame weight is continually supported through the rear connector 42, the shackle 38, and the rearward end of the spring 26. In this way, the entire length of the leaf spring continually carries part of the weight of the vehicle frame.

In the absence of an air bag or air sleeve 46, the leaf spring can undergo reverse bending, as indicated at 20A in FIG. 3, wherein the upper surface of the leaf spring becomes convex. In that case, the leaf spring cannot absorb shocks as well and the vehicle frame is subjected to large shocks from a road of given unevenness. It is possible to apply an air sleeve at the position 32 which is directly over the axle 14, to slightly depress the middle of the leaf spring to avoid reverse bending. However, applicant has found that this leads to a harsh ride. Applicant has also tried the placing of an air sleeve between the vehicle frame 22 and the rearward portion of the spring which lies between the middle 32 and the rearward end 26. Applicant has found that this also results in a harsh ride. It is believed that this is due to the fact that when a large bump B in the road is encountered, the vehicle axle will move rearwardly as well as upwardly, as in the direction indicated by arrow 48. An air sleeve along the rearward portion of the vehicle will directly transmit much of this shock directly to the frame of the vehicle, thereby resulting in a sudden shock experienced by a rider in the vehicle.

In accordance with the present invention, applicant applies an air sleeve 46 between the vehicle frame 22 and a middle location 50 on the leaf spring which is forward of the axle 14 but rearward of the front end 24 of the spring. The distance 52 of the air sleeve forward of the axle should be between 25% and 75% of the total distance 54 between the axis 56 of the axle and the axis 28a about which the front end of the spring is held to the vehicle. Applicant has found that when the air sleeve is placed less than about 25% forward of the axle there is no significant difference between that and placing the air sleeve over the axle, and in both cases a harsh ride is experienced. In a similar manner, applicant has found that when the air sleeve is placed more than 75% of the distance 54 forward of the axle 14, that there is no significant difference between the riding quality experienced with such an arrangement and the riding quality experienced when no air sleeve is present at all. Thus, the air sleeve should be placed within the area 56 which is between 25% and 75% forward of the axle 14.

Applicant has found that the ideal placement of the air sleeve is about 38% of the distance 54 forward of the axle 14 (i.e. between 25% and 50% of the distance 54 forward of the axle). For a Class A Chevy chassis, which is used for trucks and vans, the distance 54 is 26 inches, and it is found that the ideal distance 52 forward of the axle should be about 10 inches, although the ideal distance varies between 9 inches and 11 inches, depending on the individual chassis and leaf spring. For a Dodge Class A chassis, wherein the distance 54 is 28½ inches, the ideal distance 52 is also about 10 inches. For a Ford Class A chassis, the distance 54 is about 28 inches, and the ideal distance 52 is also about 10 inches. Thus, for Class A chassis the ideal distance 52 is about 10 inches and in all cases the ideal distance 52 is about 38% of the total distance 54.

Applicant has utilized a 4 inch diameter air sleeve of the type illustrated in FIG. 4 for Class A chassis. Such an air sleeve 46 contains pressured gas 72 in a chamber 74 that biases its upper and lower ends 76,78 apart. In a typical installation for a moderate size recreation vehicle, the load carried by each end of the axle 14 is about 1000 pounds. This is indicated by the load arrow 60 is FIG. 3. With the air sleeve 46 containing air at 30 psi, the load carried by the air sleeve is as indicated by the arrow 62, and equals about 175 pounds. The load 64 at the rear of the spring is about 425 pounds, while the load 66 at the front of the spring is about 400 pounds. When a bump B is encountered and the middle of the spring 32 flexes upwardly, the entire spring flexes towards a convex configuration indicated at 20A, but more flexing occurs along the rearward portion of the spring because the air sleeve resists some of the flexing that would otherwise be transmitted to the front portion of the spring. It is found that this results in a smoother absorbtion of shock than heretofore.

In a typical installation of an air sleeve 46 of 3 inches to 4½ inches in diameter in a recreational vehicle weighing about 4000 pounds, air pressure of between 20 and 100 psi is applied to the air sleeve 46, through a hose 70 (FIG. 4) leading to the spring. Of course, another gas could be used instead of air, but the device is still referred to as an air sleeve. A person installs the air sleeve as shown (and another at the opposite side of the rear axle), and applies the minimum pressure of 20 psi to the air sleeve at each side, if his chassis or frame is level. Then the person drives down a familiar section of rough road with a passenger in the rear. After each drive, if the ride is not "bouncy" he adds 5 psi to the air sleeve pressure and tries the vehicle again. When a passenger in the rear notices a bounce in the ride, then after the vehicle is stopped the pressure is reduced by 5 psi. If one side of the vehicle sags, the pressure in the air sleeve on that side is initially increased so it is 10 psi higher than the other side and then adjusted until the chassis is level.

Thus, the invention provides an improvement in a vehicle suspension which reduces the shock felt by passengers therein. In a vehicle suspension which includes a leaf spring having front and rear ends that are connected to the vehicle frame to continually support the frame through the front and rear ends of the spring, better absorbtion of shock is obtained by the use of an air sleeve placed between the middle of the spring where the axle supports it and the front of the spring. The air sleeve is preferrably placed at a distance forward of the axle which is between 25% and 75% of the total distance between the axle and the front of the spring, and preferrably between 25% and 50% of this distance forward of the axle. Tests have shown that placement of the air sleeve about 38% or ⅜ of the distance between the axle and the front end of the spring, forward of the axle, results in best shock absorbtion. It also permits a relatively small capacity air sleeve to be used which absorbs less than half of the total load carried by it and the front of the spring during quiescent operation of the vehicle, while effectively absorbing shock. While the air sleeve has been tested and used primarily for rear axle suspensions, it could be applied to front axles.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A vehicle comprising:
   a vehicle frame;
   a pair of front wheels coupled to said frame;
   a pair of rear wheels;
   a pair of rear leaf springs;
   a rear axle connected to middle portions of said leaf springs;
   front and rear connectors associated with each leaf spring, each connector continually connecting a corresponding end of a leaf spring to said vehicle frame; and
   a pair of air sleeves, each disposed between a leaf spring and said vehicle frame and supporting some of the frame weight on the spring, each sleeve connected to a spring location that is forward of the rear axle, said location spaced forward of the rear axle by a distance between 25% and 50% of the distance between the rear axle and the front end of the spring where it is held by the front connector.

2. A method for eliminating possible reverse bending in a leaf spring lying over an axle of a vehicle while retaining highly resilient support of the vehicle frame by the spring, comprising:
   placing an air sleeve between said leaf spring and frame at a location between said spring ends, to support some of the weight of the frame onto the middle portion of the spring, while continuing to support part of the vehicle frame weight through each end of the spring, whereby to provide frame-to-spring connection at three locations along the length of the spring to avoid reverse bending in a substantially flat spring;
   said location of said air sleeve being forward of the axle and rearward of the front end of the spring, whereby to leave a long rearward spring portion which is unconnected to the frame to smoothly absorb bumps.

3. The method described in claim 2 wherein:
said location lies at a distance forward of the axle which is between 25% and 75% of the total distance between the axle and the forward end of the spring.

* * * * *